United States Patent
Blum et al.

(10) Patent No.: US 9,690,117 B2
(45) Date of Patent: Jun. 27, 2017

(54) ELECTRICALLY CONDUCTIVE LENS CONNECTION AND METHODS OF MAKING THE SAME

(71) Applicant: Mitsui Chemicals, Inc., Tokyo (JP)

(72) Inventors: Ronald D. Blum, Roanoke, VA (US);
Charles Willey, Roanoke, VA (US);
Joshua Haddock, Roanoke, VA (US)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 14/692,304

(22) Filed: Apr. 21, 2015

(65) Prior Publication Data

US 2015/0226984 A1    Aug. 13, 2015

Related U.S. Application Data

(63) Continuation of application No. 13/866,575, filed on Apr. 19, 2013, now abandoned.

(60) Provisional application No. 61/638,290, filed on Apr. 25, 2012.

(51) Int. Cl.
*G02C 7/08* (2006.01)
*G02C 1/00* (2006.01)
*G02C 7/10* (2006.01)
*G02C 13/00* (2006.01)
*G02C 5/00* (2006.01)

(52) U.S. Cl.
CPC .............. *G02C 7/083* (2013.01); *G02C 1/10* (2013.01); *G02C 5/008* (2013.01); *G02C 7/101* (2013.01); *G02C 13/00* (2013.01); *G02C 13/001* (2013.01)

(58) Field of Classification Search
CPC . G02C 7/083; G02C 1/10; G02C 5/08; G02C 7/101; G02C 13/00; G02C 13/001; G02C 7/02; G02C 5/008
USPC ..................................................... 351/159.39
See application file for complete search history.

(56) References Cited

U.S. PATENT DOCUMENTS

| | | | |
|---|---|---|---|
| 6,225,205 B1 | 5/2001 | Kinoshita | |
| 6,619,799 B1 * | 9/2003 | Blum | A61B 3/0285 351/159.39 |
| 6,631,023 B1 * | 10/2003 | Berneth | C09K 9/02 204/192.22 |
| 6,871,951 B2 | 3/2005 | Blum et al. | |
| 7,077,519 B2 | 7/2006 | Blum et al. | |
| 7,810,421 B2 * | 10/2010 | Hiza | F42D 5/00 102/364 |
| 2009/0201461 A1 | 8/2009 | Kosa et al. | |
| 2009/0256977 A1 | 10/2009 | Haddock et al. | |
| 2010/0177277 A1 | 7/2010 | Kokonaski et al. | |
| 2010/0265456 A1 | 10/2010 | Matsui | |
| 2012/0002159 A1 | 1/2012 | Blum et al. | |

(Continued)

FOREIGN PATENT DOCUMENTS

| | | |
|---|---|---|
| EP | 2 233 964 A1 | 9/2010 |
| JP | S63107086 A | 5/1988 |

(Continued)

*Primary Examiner* — Kristina Deherrera
(74) *Attorney, Agent, or Firm* — Sterne, Kessler, Goldstein & Fox P.L.L.C.

(57) ABSTRACT

The present invention relates generally to electro-active optical systems, such as a pair of spectacles having one or more lenses that employ electro-active optical structures. In some embodiments, the invention relates to electro-active optical systems having a flexible electrically conductive connection between the lens and the frame.

23 Claims, 16 Drawing Sheets

(56) References Cited

U.S. PATENT DOCUMENTS

| | | |
|---|---|---|
| 2012/0058653 A1 | 3/2012 | Rathburn |
| 2012/0154739 A1* | 6/2012 | Turshani ............ C08G 18/3243 351/159.03 |
| 2012/0281179 A1 | 11/2012 | Wang et al. |
| 2013/0010256 A1 | 1/2013 | Haddock et al. |
| 2013/0037202 A1 | 2/2013 | Ando et al. |

FOREIGN PATENT DOCUMENTS

| | | |
|---|---|---|
| JP | H11274209 A | 10/1999 |
| JP | 2009053258 A | 3/2009 |
| JP | 2011209749 A | 10/2011 |
| WO | WO 01/02897 A1 | 1/2001 |
| WO | WO 2010080999 A1 | 7/2010 |
| WO | WO 2011/093530 A1 | 8/2011 |

* cited by examiner

ELECTRICALLY CONDUCTIVE LENS CONNECTION AND METHODS OF MAKING THE SAME

CROSS-REFERENCE TO RELATED APPLICATIONS

The present application is a continuation application of U.S. patent application Ser. No. 13/866,575, filed Apr. 19, 2013, which claims the benefit of priority to U.S. Provisional Patent Application No. 61/638,290, filed Apr. 25, 2012, which are hereby incorporated by reference as though fully set forth herein.

FIELD

The present invention relates generally to electro-active optical systems, such as a pair of spectacles having one or more lenses that employ electro-active optical structures. In some embodiments, the invention relates to electro-active optical systems having a flexible electrically conductive connection between the lens and the frame.

BACKGROUND

Certain electro-active optical systems include one or more lenses having an electro-active optical structure. In many instances, such structures lie in an interior portion of the lens, and are therefore physically removed from a control unit. In some instances, such as with a pair of spectacles, the control unit may lie in some portion of the frame or in may be external to the frame and connect to the lens via the frame. In such instances, the lens can have transparent conductive structures (e.g., conductive lines) that connect the electro-active optical structure to a contact on the edge of the lens, for example. To be in electrical communication with the control unit, such contacts on the edge of the lens must be in electrical communication with electrical contacts that are part of the frame.

In some instances, the contacts on the lens can be positioned so as to line up with one or more contacts on the frame, such that an electrical connection is made when the lens is fit into the frame. The lens-frame connection can loosen over time, however. Therefore, one can also employ an electrically conductive pre-formed deformable article that lies between the lens and the frame. This deformable article can provide a robust electrical connection, while maintaining the contact even as the physical connection between the frame and lens loosens. But over time, even these connections can fail, as they rely on physical contact.

Thus, it may be desirable to develop electrically conductive deformable connectors that will remain robust, even as the frames loosen over time.

SUMMARY

In at least one aspect, the invention provides a pair of spectacles comprising: a first lens and a second lens, wherein the first lens comprises an electro-active region in an interior portion, an electrical contact on an edge portion, and a transparent wire electrically connecting the electro-active region to the edge contact; a controller; a frame, wherein the frame comprises a first contact disposed adjacent to the first lens, and one or more wires electrically connecting the first contact to the controller; and a first conductive element that electrically connects the edge contact of the first lens to the first contact of the frame, the first conductive element being at least partially formed from a conductive elastomeric material that adheres to the edge contact of the first lens and the contact of the frame.

In another aspect, the invention provides a method of forming an electrical connection between a spectacle lens and a frame, the method comprising: providing a spectacle lens, which comprises an electro-active region in an interior portion, an electrical contact on an edge portion, and a transparent wire electrically connecting the electro-active region to the edge contact; providing a frame, which comprises an electrical contact disposed on an interior portion of the frame; and disposing a flowable conductive material between the electrical contact of the spectacle lens and the electrical contact of the frame, the flowable conductive material being a curable material.

Further aspects and embodiments of the invention are provided in the detailed description that follows and in the accompanying figures.

BRIEF DESCRIPTION OF DRAWINGS

The application includes the following figures. These figures depict certain illustrative embodiments of various aspects of the invention. In some instances, the figures do not necessarily provide a proportional illustration of an actual embodiment of the invention, but may emphasize certain features for purposes of illustration. The figures are not intended to limit the scope of the claimed subject matter apart from an express indication to the contrary.

DETAILED DESCRIPTION

Figure 1:
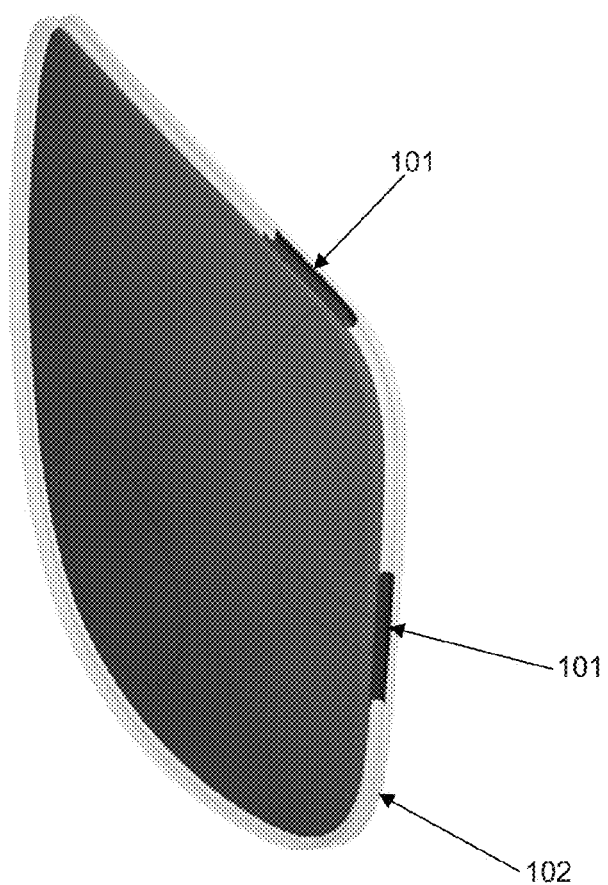
FIG. 1 depicts a lens according to certain embodiments of the invention.

The following description recites various aspects and embodiments of the present invention. No particular embodiment is intended to define the scope of the invention. Rather, the embodiments merely provide non-limiting examples various compositions, apparatuses, and methods that are at least included within the scope of the invention. The description is to be read from the perspective of one of ordinary skill in the art; therefore, information well known to the skilled artisan is not necessarily included.

As used herein, the articles "a," "an," and "the" include plural referents, unless expressly and unequivocally disclaimed.

As used herein, the conjunction "or" does not imply a disjunctive set. Thus, the phrase "A or B is present" includes each of the following scenarios: (a) A is present and B is not present; (b) A is not present and B is present; and (c) A and B are both present. Thus, the term "or" does not imply an either/or situation, unless expressly indicated.

As used herein, the term "comprise," "comprises," or "comprising" implies an open set, such that other elements can be present in addition to those expressly recited.

Unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

In at least one aspect, the invention provides a pair of spectacles comprising: a first lens and a second lens, wherein the first lens comprises an electro-active region in an interior portion, an electrical contact on an edge portion, and a transparent wire electrically connecting the electro-active region to the edge contact; a controller; a frame, wherein the frame comprises a first contact disposed adjacent to the first lens, and one or more wires electrically connecting the first contact to the controller; and a first conductive element that electrically connects the edge contact of the first lens to the first contact of the frame, the first conductive element being at least partially formed from a conductive elastomeric material that adheres to the edge contact of the first lens and the contact of the frame.

In some embodiments, the first lens and the second lens are disposed in a frame. The invention is not limited to any particular frame design, as long as it provides physical support for the spectacles and assists in maintaining the proper positioning of the spectacles on the wearer's face for optimal vision correction. In some embodiments, the frame includes a structure that wraps around the entirety of the outer edges of the first lens and second lens. In other embodiments, the frame includes a structure that only wraps around a portion of the first lens and the second lens, e.g., the top of the lens and at least part of the two sides. In some other embodiments, the frame is a structure that physically attaches to first lens and second lens. In some such embodiments, the frame includes no structure that wraps around any part of either the first lens or the second lens. In some embodiments, the frame comprises structures that permit electrical communication with the one or more electro-active optical structures disposed in the first lens or second lens, including various contacts, wires, and the like.

At least one of the lenses in the pair of spectacles comprises an electro-active optical zone. In some embodiments, both the first lens and the second lens comprise an electro-active optical zone. Lenses having electro-active optical zones are generally described in various references, including U.S. Pat. Nos. 6,619,799; 7,290,875; 6,626,532; and 7,009,757; and U.S. Published Patent Application No. 2013/0027655, each of which are incorporated by reference as though fully set forth herein.

As used herein, an electro-active zone or an electro-active element refers to a device with an optical property that is alterable by the application of electrical energy. The alterable optical property may be, for example, optical power, focal length, diffraction efficiency, depth of field, optical transmittance, tinting, opacity, refractive index, chromatic dispersion, or a combination thereof. An electro-active element may be constructed from two substrates and an electro-active material disposed between the two substrates. The substrates may be shaped and sized to ensure that the electro-active material is contained within the substrates and cannot leak out. One or more electrodes may be disposed on each surface of the substrates that is in contact with the electro-active material. The electro-active element may include a power supply operably connected to a controller. The controller may be operably connected to the electrodes by way of electrical connections to apply one or more voltages to each of the electrodes. When electrical energy is applied to the electro-active material by way of the electrodes, the electro-active material's optical property may be altered. For example, when electrical energy is applied to the electro-active material by way of the electrodes, the electro-active material's index of refraction may be altered, thereby changing the optical power of the electro-active element.

The electro-active element or zone may be embedded within or attached to a surface of an ophthalmic lens to form an electro-active lens. Alternatively, the electro-active element may be embedded within or attached to a surface of an optic which provides substantially no optical power to form an electro-active optic. In such a case, the electro-active element or zone may be in optical communication with an ophthalmic lens, but separated or spaced apart from or not integral with the ophthalmic lens. The ophthalmic lens may be an optical substrate or a lens.

A "lens" is any device or portion of a device that causes light to converge or diverge (i.e., a lens is capable of focusing light). A lens may be refractive or diffractive, or a combination thereof. A lens may be concave, convex, or planar on one or both surfaces. A lens may be spherical, cylindrical, prismatic, or a combination thereof. A lens may be made of optical glass, plastic, thermoplastic resins, thermoset resins, a composite of glass and resin, or a composite of different optical grade resins or plastics. It should be pointed out that within the optical industry a device can be referred to as a lens even if it has zero optical power (known as plano or no optical power). In these cases, the lens can be referred to as a "plano lens." A lens may be either conventional or non-conventional. A conventional lens corrects for conventional errors of the eye including lower order aberrations such as myopia, hyperopia, presbyopia, and regular astigmatism. A non-conventional lens corrects for non-conventional errors of the eye including higher order aberrations that can be caused by ocular layer irregularities or abnormalities. The lens may be a single focus lens or a multifocal lens such as a Progressive Addition Lens or a bifocal or trifocal lens. Contrastingly, an "optic," as used herein, has substantially no optical power and is not capable of focusing light (either by refraction or diffraction). The term "refractive error" may refer to either conventional or non-conventional errors of the eye. It should be noted that redirecting light is not correcting a refractive error of the eye. Therefore, redirecting light to a healthy portion of the retina, for example, is not correcting a refractive error of the eye.

In some embodiments, the electro-active zone includes at least one cavity, which is filled with an electro-active material. Consistent with the above discussion, this cavity can be located at any suitable location. For example, in some embodiments, the cavity lies on the outer or inner surface of an ophthalmic lens. In other embodiments, the cavity lies in the interior of an ophthalmic lens. In general, the cavity is a sealed cavity, thereby preventing the electro-active material from leaving the cavity during everyday use. Any suitable electro-active material can be used, including any optically birefringent material, including, but not limited to, liquid crystals.

The electro-active zone can operate as a free-standing cell, meaning that it is capable of changing optical power in a standalone manner when electricity or an electrical potential is applied. The electro-active zone can be located in any suitable portion of the lens. In some embodiments, the electro-active zone is located in the entire viewing area of the electro-active lens, while, in other embodiments, it is located in just a portion thereof. The electro-active zone may be located near the top, middle, or bottom portion of the lens. It should be noted that the electro-active zone may be capable of focusing light on its own and does not need to be combined with an optical substrate or lens.

In certain embodiments, one or both lenses in the spectacles include certain zones that correct for refractive errors of the corresponding eye of a subject (i.e., a wearer). The following discussion will refer to the lens in the singular, it being understood that the features described can be implemented in both lenses of a pair of spectacles, with the degree of correction related to the refractive error present in the corresponding eye of the wearer.

In some embodiments, the lens comprises one or more conductive wires that connect the electro-active optical structure to one or more contacts on the edge of the lens. In some embodiments, these conductive wires are transparent, meaning that the material transmits at least 75%, or at least 80%, or at least 85%, or at least 90%, or at least 95%, or at least 97%, or at least 99% of visible light. These conductive wires can be made of any suitable material, such as indium tin oxide, conductive polymers, or combinations thereof. In some such embodiments, the lens comprises one or more contacts on the edge of the lens, each of which is in electrical communication with at least one of the conductive wires. These contacts can be made of any suitable material. In some embodiments, these contacts are transparent (as defined above). In some other embodiments, they are not. In some embodiments, these contacts are made of a deformable material, such as a conductive elastomeric material.

The frame comprises a contact disposed adjacent to the lens. In some embodiments, this contact is on the interior part of the lens facing the edge portion of the lens. In some embodiments, the frame comprises more than one such contact. Such contacts connect to one or more wires that are in electrical communication with a control unit, which at least controls the electro-active optical structure in the lens. The invention is not limited to any particular type of wires. In some embodiments, the wires are external to the frame, or are part of the frame itself. In some other embodiments, the wires are enclosed within the frame.

The pair of spectacles includes a control unit. The control unit can be connected to the pair of spectacles in any suitable way. In some embodiments, the control unit is not part of the frame. For example, the control unit can be connected to the frame via a wire, or may communicate to the frame wirelessly, such that the control signals are transmitted to electrically signals that run through the wires to the contacts. In some other embodiments, the control unit is disposed on the exterior of the frame, or, in some other embodiments, is enclosed by the frame. The control unit can perform a variety of functions, including controlling the electro-active optical structure within the lens.

The pair of spectacles also includes a conductive element that electrically connects the edge contact of the lens to the contact of the frame. The conductive element is formed from a conductive material. In some embodiments, the conductive material is elastomeric. In some embodiments, the conductive material is flexible. In embodiments, where the conductive element is flexible and/or elastomeric, it can deform slightly to account for changes in the fit between the frame and the lens over time. In some further embodiments, the conductive material adheres to the edge contact of the first lens and to the contact of the frame, meaning that the material resists separation from either of the contacts when a force is applied that would otherwise cause separation. In such embodiments, the conductive element does not maintain contact with the contacts merely by physical compression. In such embodiments, the conductive element need not be places under any compressive stress at all because, due to its adhering to the contacts, it can deform itself in response to changes in the fit between the lens and the frame.

In some embodiments, the conductive element at least partially fills a cavity between the lens and the frame. In some such embodiments, the cavity is formed by a groove formed in the frame, the lens, or both the frame and the lens.

In some embodiments, certain coatings or layers can be added to the lens or frame, so as to improve the adherence of the conductive element. Thus, in some embodiments, the portion of the lens or frame that makes contact with the conductive element can be coated with a conductive primer, a conductive paint, a conductive polymer, or any combination thereof, so as to assist in forming an adherent contact between the conductive element and the contacts. Further, these surfaces can be treated physically, such as by scoring and the like. In some other embodiments, a conductive rubber piece can be disposed between either or both of the contacts and the conductive element.

The conductive element can be formed from any suitable conductive material. In some embodiments, the conductive material is a conductive caulk. In some embodiments, it is a moisture-resistant material. In some embodiments, the conductive material comprises an adhesive binder and conductive particles. Any suitable adhesive binder can be used. In some embodiments, the adhesive binder is a cured material. In some such embodiments, the adhesive binder comprises a material selected from the group consisting of a silicone resin, an epoxy resin, a polyurethane resin, and any combinations thereof. In some such embodiments, the adhesive binder is a silicone resin. In some other such embodiments, the adhesive binder is an epoxy resin. In some further such embodiments, the adhesive binder is a polyurethane resin. As to the conductive particles, any suitable conductive particles can be used. In some embodiments, the conducive particles are selected from the group consisting of silver particles, silver-coated particles (e.g., silver-plated aluminum silver-plated copper), nickel, nickel-coated particles (e.g., nickel-coated carbon), and any combination thereof. The conductive material can have any suitable ratio of the binder to the conductive particles, so long as there is enough binder to maintain physical integrity and there are enough conductive particles to allow for electrical conductivity.

The conductive structure can have any suitable size, depending on separation of the lens from the frame and any cavity included.

The conductive material can include other ingredients as well. In some embodiments, the conductive material includes an additive for providing a tint to the material. In this way, the color of the material can be adjusted to be similar to that of the frame.

FIG. 1 depicts a lens 100 according to certain embodiments of the invention. The lens 100 has electrical contacts 101 and a cavity 102 formed around its edge.

Figure 2:
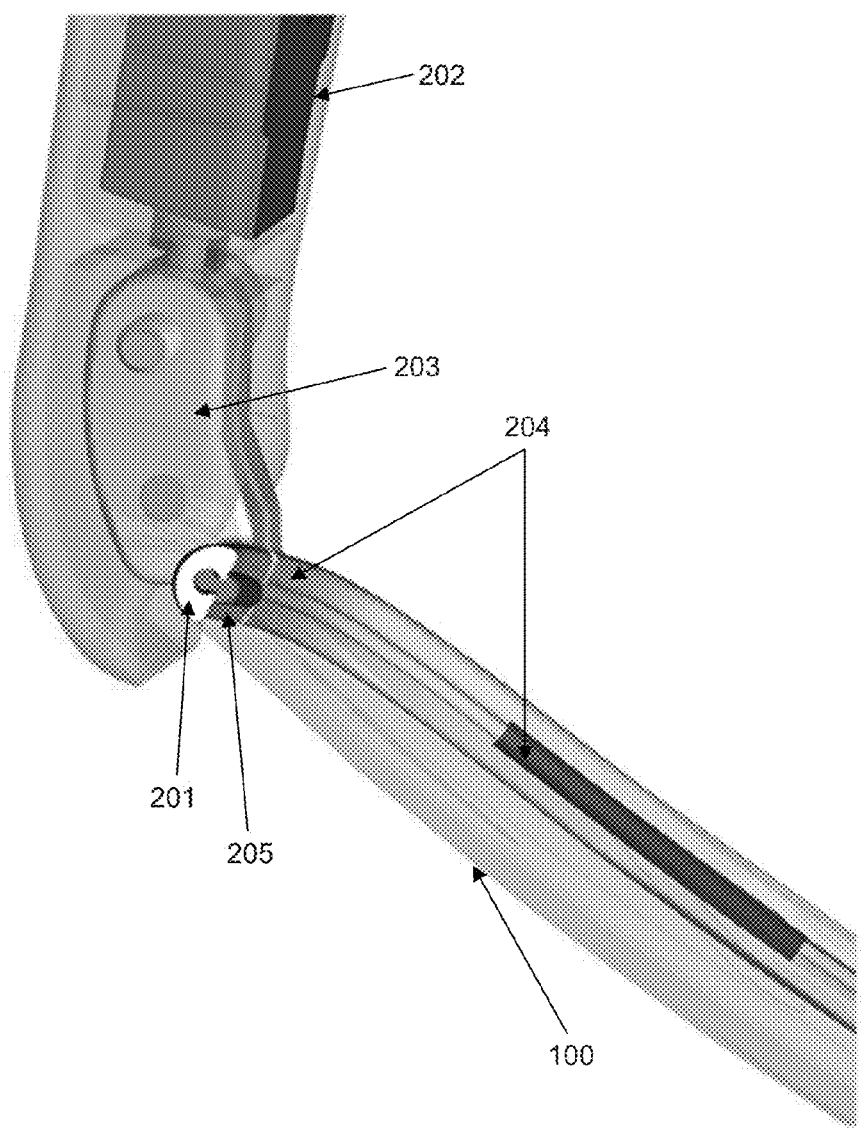
FIG. 2 depicts pair of spectacles according to one embodiment of the invention.

FIG. 2 depicts pair of spectacles 200 according to one embodiment of the invention, which contains a lens 100 within the frame 201. The pair of spectacles 200 has a controller 202, a hinge 203, contacts on the frame 204, and the conductive element 205.

Figure 3:
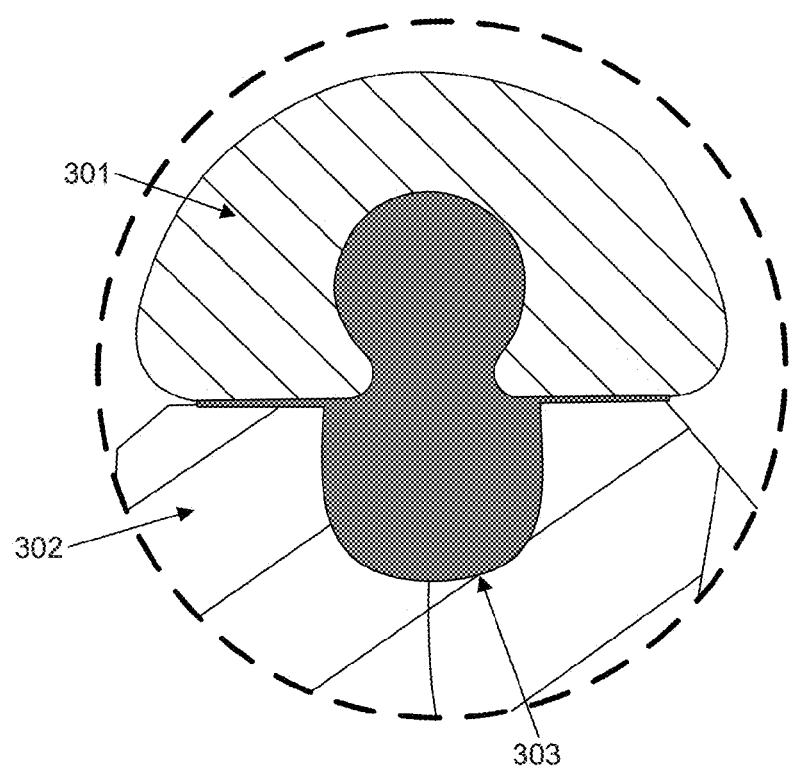
FIG. 3 depicts an interface between the frame and lens according to one embodiment of the invention.

FIG. 3 depicts an interface between the frame and lens according to one embodiment of the invention. The figure depicts a frame 301, a lens 302, and a conductive element 303.

Figure 4:
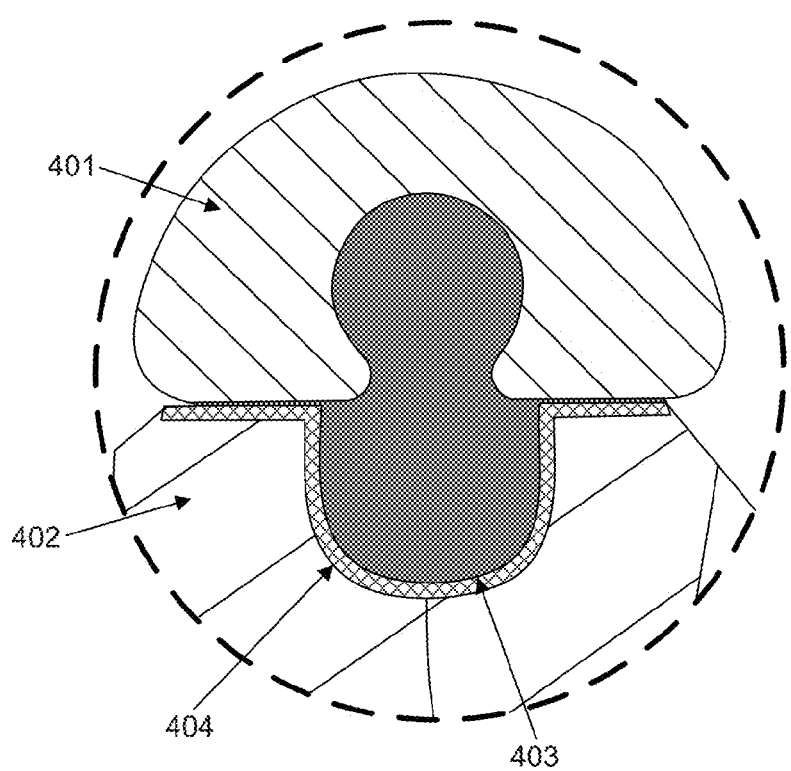
FIG. 4 depicts an interface between the frame and lens according to one embodiment of the invention.

FIG. 4 depicts an interface between the frame and lens according to one embodiment of the invention. The figure depicts a frame 401, a lens 402, a conductive element 403, and a layer of conductive primer 404.

Figure 5:
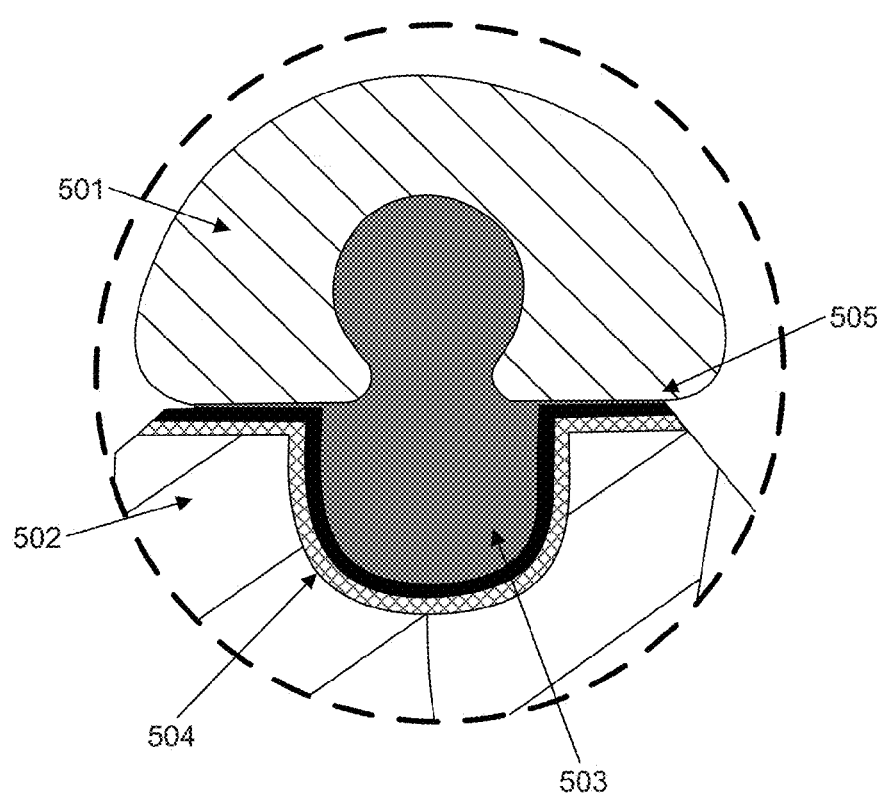
FIG. 5 depicts an interface between the frame and lens according to one embodiment of the invention.

FIG. 5 depicts an interface between the frame and lens according to one embodiment of the invention. The figure depicts a frame 501, a lens 502, a conductive element 503, a layer of conductive primer 504, and a layer of conductive paint 505.

Figure 6:
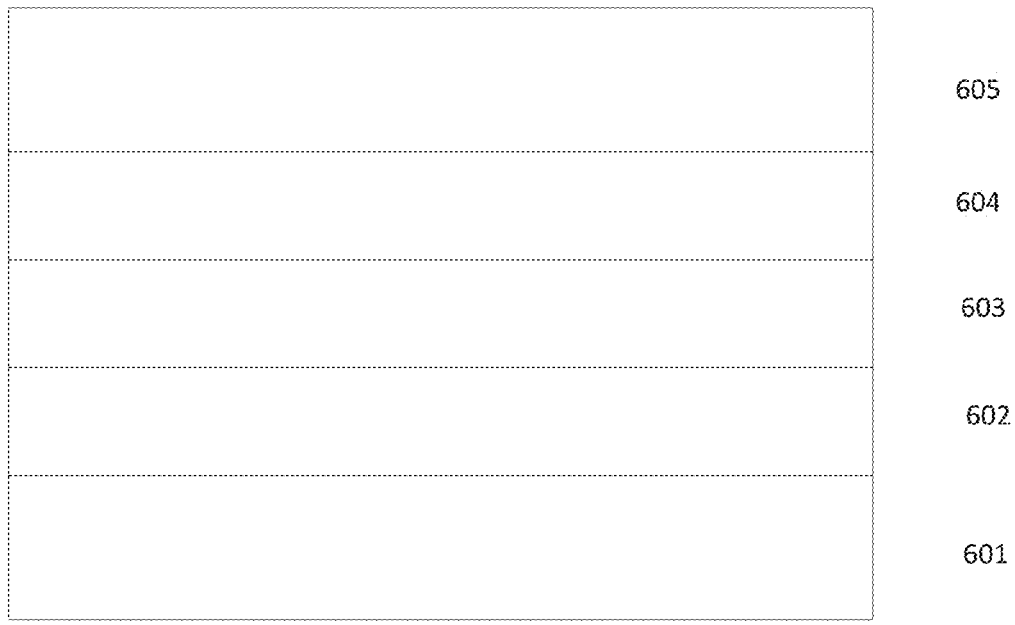
FIG. 6 depicts the disposition of layers at the interface between the frame and the lens according to one embodiment of the invention.

FIG. 6 depicts the disposition of layers at the interface between the frame and the lens according to one embodiment of the invention. The figure depicts a lens with an exposed contact 601, a layer of electrically conductive paint 602, the conductive element 603, a conductive rubber piece 604, and the electrical contact on the frame 605.

Figure 7:
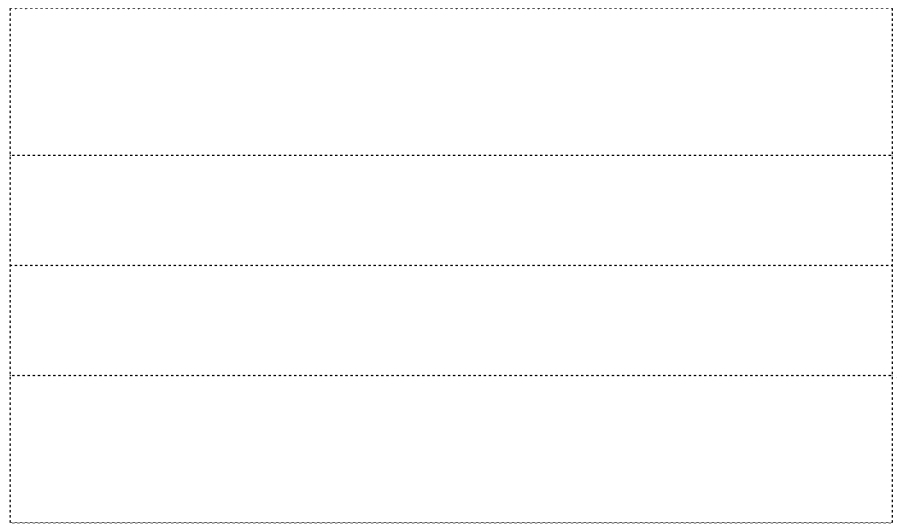
FIG. 7 depicts the disposition of layers at the interface between the frame and the lens according to one embodiment of the invention.

FIG. 7 depicts the disposition of layers at the interface between the frame and the lens according to one embodiment of the invention. The figure depicts a lens with an exposed contact 701, a layer of electrically conductive paint 702, the conductive element 703, and the electrical contact on the frame 704.

Figure 8:
FIG. 8 depicts the disposition of layers at the interface between the frame and the lens according to one embodiment of the invention.

FIG. 8 depicts the disposition of layers at the interface between the frame and the lens according to one embodiment of the invention. The figure depicts a lens with an exposed contact 801, the conductive element 802, and the electrical contact on the frame 803.

Figure 9:
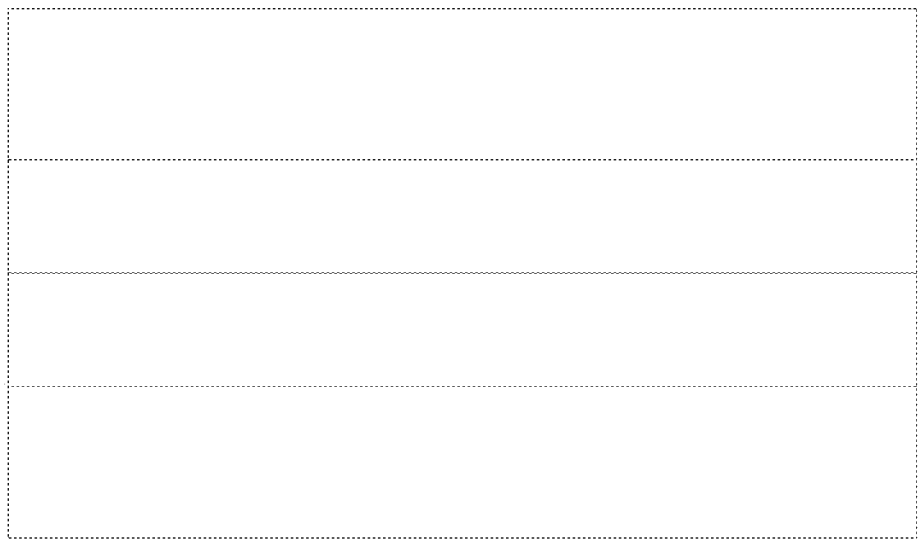
FIG. 9 depicts the disposition of layers at the interface between the frame and the lens according to one embodiment of the invention.

FIG. 9 depicts the disposition of layers at the interface between the frame and the lens according to one embodiment of the invention. The figure depicts a lens with an exposed contact 901, a layer of electrically conductive primer 902, the conductive element 903, and the electrical contact on the frame 904.

Figure 10:
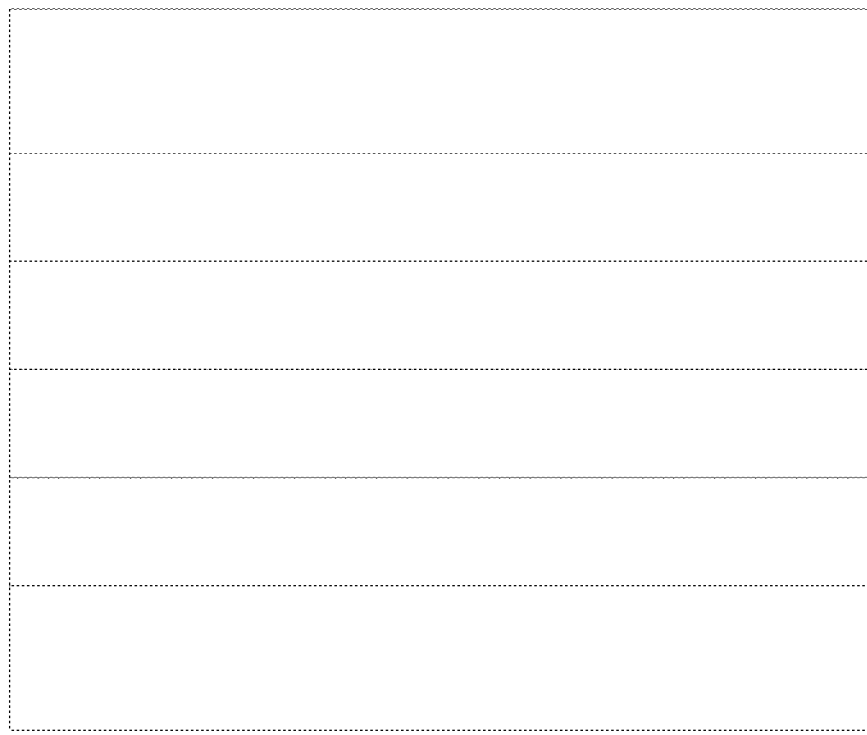
FIG. 10 depicts the disposition of layers at the interface between the frame and the lens according to one embodiment of the invention.

FIG. 10 depicts the disposition of layers at the interface between the frame and the lens according to one embodiment of the invention. The figure depicts a lens with an exposed contact 1001, a layer of electrically conductive primer 1002, a layer of electrically conductive paint 1003, the conductive element 1004, a conductive rubber piece 1005, and the electrical contact on the frame 1006.

Figure 11:
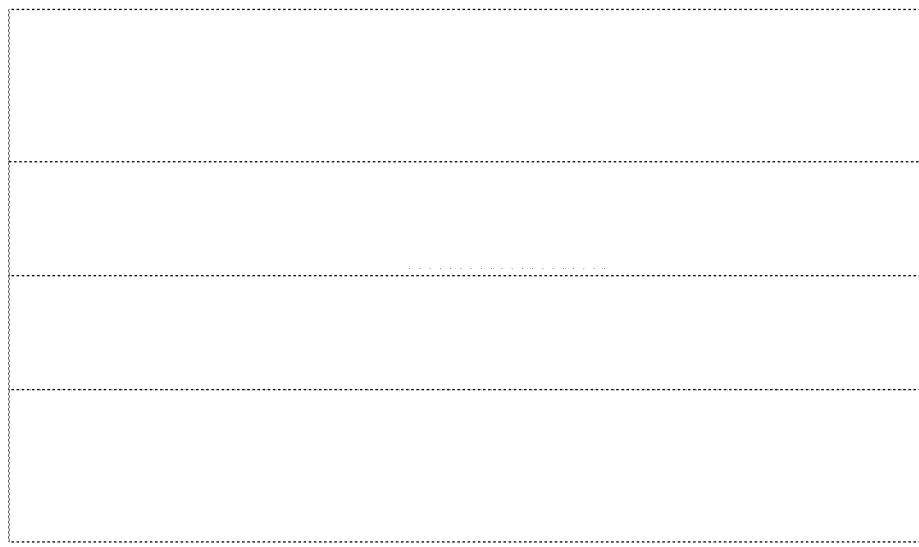
FIG. 11 depicts the disposition of layers at the interface between the frame and the lens according to one embodiment of the invention.

FIG. 11 depicts the disposition of layers at the interface between the frame and the lens according to one embodiment of the invention. The figure depicts a lens with an exposed contact 1101, a layer of electrically conductive polymer 1102, the conductive element 1103, and the electrical contact on the frame 1104.

Figure 12:
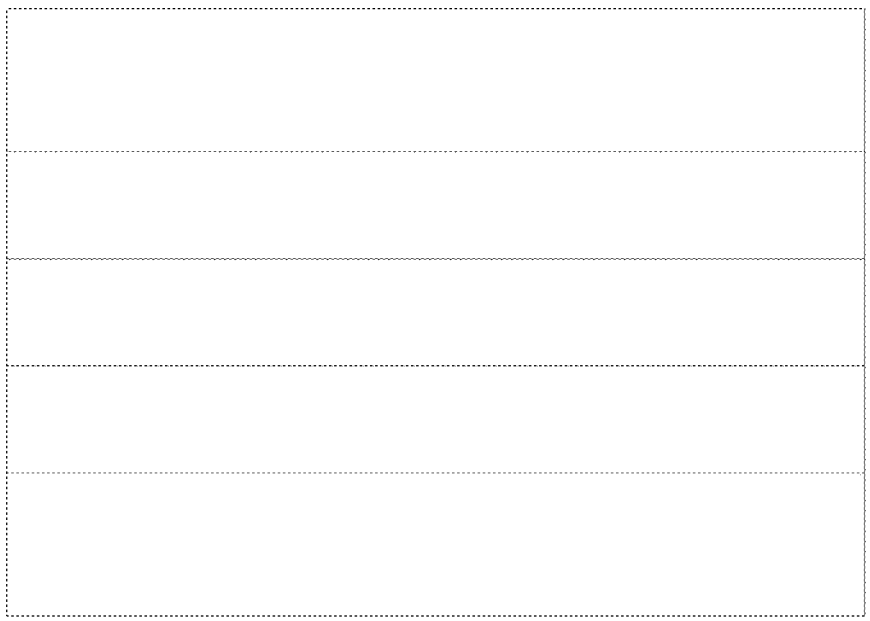
FIG. 12 depicts the disposition of layers at the interface between the frame and the lens according to one embodiment of the invention.

FIG. 12 depicts the disposition of layers at the interface between the frame and the lens according to one embodiment of the invention. The figure depicts a lens with an exposed contact 1201, a layer of electrically conductive polymer 1202, the conductive element 1203, a conductive rubber piece 1204, and the electrical contact on the frame 1205.

In another aspect, the invention provides a method of forming an electrical connection between a spectacle lens and a frame, the method comprising: providing a spectacle lens, which comprises an electro-active region in an interior portion, an electrical contact on an edge portion, and a transparent wire electrically connecting the electro-active region to the edge contact; providing a frame, which comprises an electrical contact disposed on an interior portion of the frame; and disposing a flowable conductive material between the electrical contact of the spectacle lens and the electrical contact of the frame, the flowable conductive material being a curable material.

The method includes providing a spectacle lens, which comprises an electro-active region in an interior portion, an electrical contact on an edge portion, and a transparent wire electrically connecting the electro-active region to the edge contact. The invention can employ any suitable lens that possess these features. For example, in some embodiments, the spectacle lens can be a lens according to any of the embodiments described above in this disclosure.

The method also includes providing a frame, which comprises an electrical contact disposed on an interior portion of the frame. The invention can employ any suitable frame that possesses these features. For example, in some embodiments, the frame can be a lens according to any of the embodiments described above in this disclosure.

The method also includes disposing a flowable conductive material between the electrical contact of the spectacle lens and the electrical contact of the frame. This can be carried out in any suitable way. In some embodiments, the disposing comprises: disposing an amount of the flowable conductive material onto an edge portion of the spectacle lens; and disposing the spectacle lens into the frame such that the flowable conductive material makes contact with and electrically connects the electrical contact of the spectacle lens and the electrical contact of the frame. In some other embodiments, the disposing comprises: disposing an amount of the flowable conductive material onto an interior portion of the frame; and disposing the spectacle lens into the frame such that the flowable conductive material makes contact with and electrically connects the electrical contact of the spectacle lens and the electrical contact of the frame. In some other embodiments, the disposing comprises: disposing the spectacle lens into the frame; and disposing an amount of the flowable conductive material between the spectacle lens and the frame, such that the flowable conductive material makes contact with and electrically connects the electrical contact of the spectacle lens and the electrical contact of the frame.

In some embodiments, the flowable conductive material is a curable material, such as a conductive caulk. Such curing can be done by any suitable means, including, but not limited to, drying, heating, exposing to light, such as UV light, undergoing a chemical reaction, etc. In some embodiments, the curing is performed by drying. In some such embodiments, the method further comprises, following the disposing step, curing the flowable conductive material to form a conductive element.

In some embodiments, the conductive element at least partially fills a cavity between the lens and the frame. In some such embodiments, the cavity is formed by a groove formed in the frame, the lens, or both the frame and the lens.

In some embodiments, certain coatings or layers can be added to the lens or frame, so as to improve the adherence of the conductive element. Thus, in some embodiments, the portion of the lens or frame that makes contact with the conductive element can be coated with a conductive primer, a conductive paint, a conductive polymer, or any combination thereof, so as to assist in forming an adherent contact between the conductive element and the contacts. Further, these surfaces can be treated physically, such as by scoring and the like, to improve the adherent contact between the conductive element and one or both contacts. In some other embodiments, a conductive rubber piece can be disposed between either or both of the contacts and the conductive element.

The conductive element can be formed from any suitable conductive material. In some embodiments, the conductive material is a conductive caulk. In some embodiments, it is a moisture-resistant material. In some embodiments, the conductive material comprises an adhesive binder and conductive particles. Any suitable adhesive binder can be used. In some embodiments, the adhesive binder is a cured material. In some such embodiments, the adhesive binder comprises a material selected from the group consisting of a silicone resin, an epoxy resin, a polyurethane resin, and any combinations thereof. In some such embodiments, the adhesive binder is a silicone resin. In some other such embodiments, the adhesive binder is an epoxy resin. In some further such embodiments, the adhesive binder is a polyurethane resin. As to the conductive particles, any suitable conductive particles can be used. In some embodiments, the conducive particles are selected from the group consisting of silver particles, silver-coated particles (e.g., silver-plated aluminum silver-plated copper), nickel, nickel-coated particles (e.g., nickel-coated carbon), and any combination thereof. The conductive material can have any suitable ratio of the binder to the conductive particles, so long as there is enough binder to maintain physical integrity and there are enough conductive particles to allow for electrical conductivity.

The conductive structure can have any suitable size, depending on separation of the lens from the frame and any cavity included.

The conductive material can include other ingredients as well. In some embodiments, the conductive material includes an additive for providing a tint to the material. In this way, the color of the material can be adjusted to be similar to that of the frame.

Figure 13:
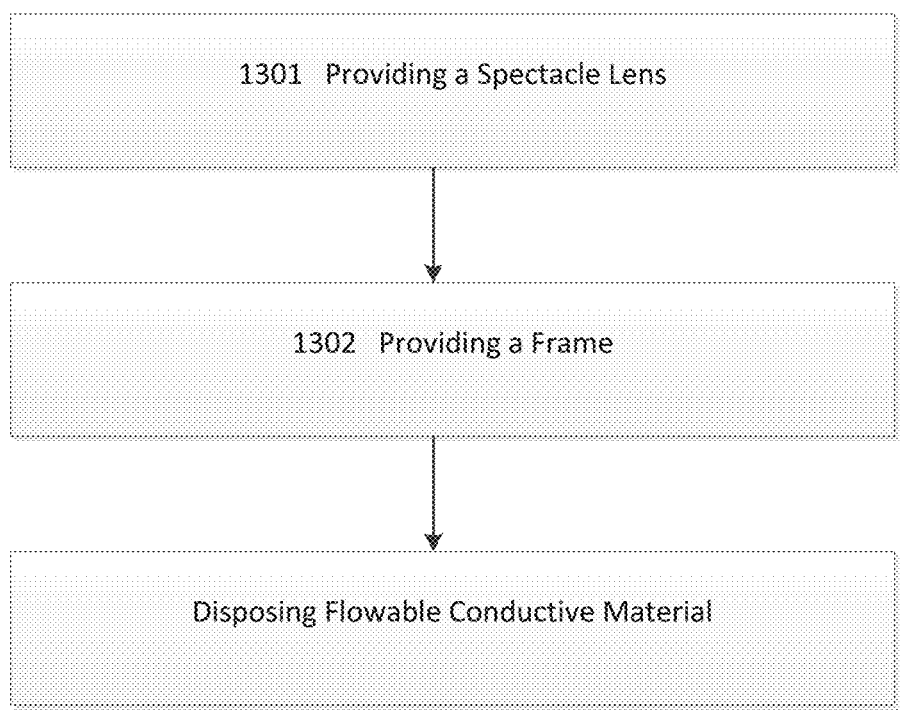
FIG. 13 depicts a flow chart showing an embodiment of a method of forming an electrical connection between a spectacle lens and a frame.

FIG. 13 depicts a flow chart showing an embodiment of a method of forming an electrical connection between a spectacle lens and a frame 1300, comprising: providing a spectacle lens, which comprises an electro-active region in an interior portion, an electrical contact on an edge portion, and a transparent wire electrically connecting the electro-active region to the edge contact 1301; providing a frame, which comprises an electrical contact disposed on an interior portion of the frame 1302; and disposing a flowable conductive material between the electrical contact of the spectacle lens and the electrical contact of the frame, the flowable conductive material being a curable material 1303.

Figure 14:
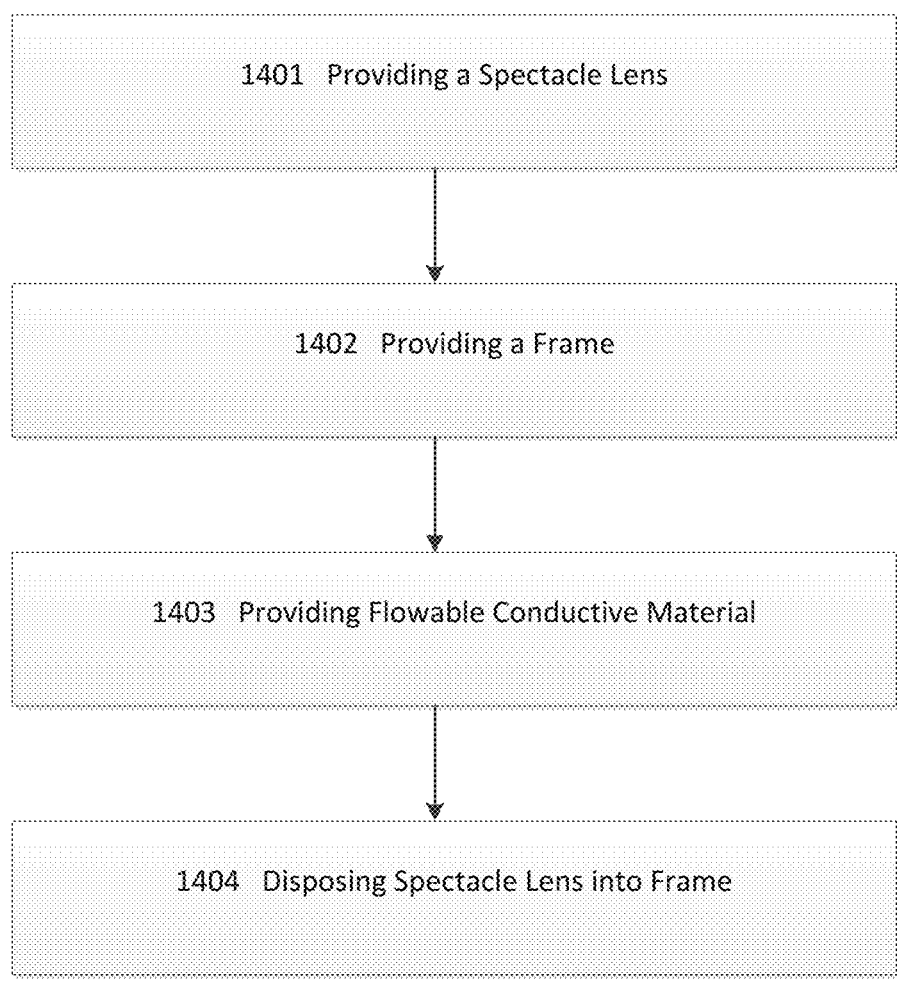
FIG. 14 depicts a flow chart showing an embodiment of a method of forming an electrical connection between a spectacle lens and a frame.

FIG. 14 depicts a flow chart showing an embodiment of a method of forming an electrical connection between a spectacle lens and a frame 1400, comprising: providing a spectacle lens, which comprises an electro-active region in an interior portion, an electrical contact on an edge portion, and a transparent wire electrically connecting the electro-active region to the edge contact 1401; providing a frame, which comprises an electrical contact disposed on an interior portion of the frame 1402; disposing an amount of the flowable conductive material onto an edge portion of the spectacle lens 1403; and disposing the spectacle lens into the frame such that the flowable conductive material makes contact with and electrically connects the electrical contact of the spectacle lens and the electrical contact of the frame 1404.

Figure 15:
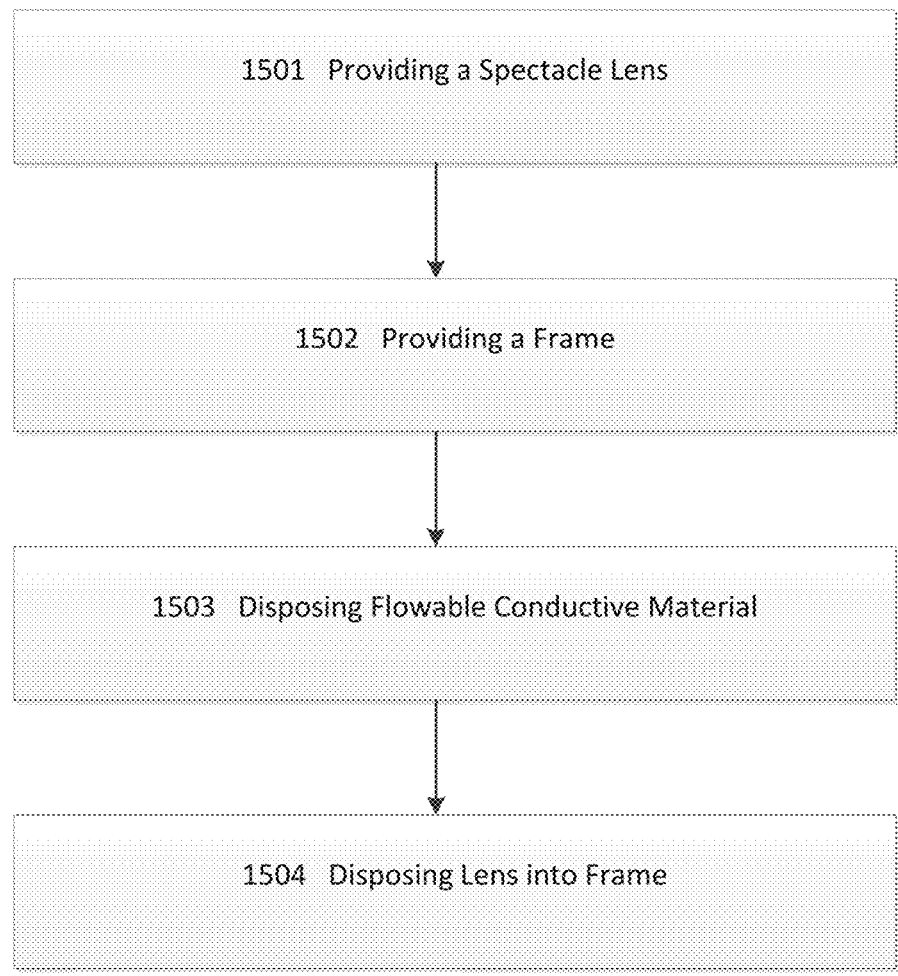
FIG. 15 depicts a flow chart showing an embodiment of a method of forming an electrical connection between a spectacle lens and a frame.

FIG. 15 depicts a flow chart showing an embodiment of a method of forming an electrical connection between a spectacle lens and a frame 1500, comprising: providing a spectacle lens, which comprises an electro-active region in an interior portion, an electrical contact on an edge portion, and a transparent wire electrically connecting the electro-active region to the edge contact 1501; providing a frame, which comprises an electrical contact disposed on an interior portion of the frame 1502; disposing an amount of the flowable conductive material onto an interior portion of the frame 1503; disposing the spectacle lens into the frame such that the flowable conductive material makes contact with and electrically connects the electrical contact of the spectacle lens and the electrical contact of the frame 1504.

Figure 16:
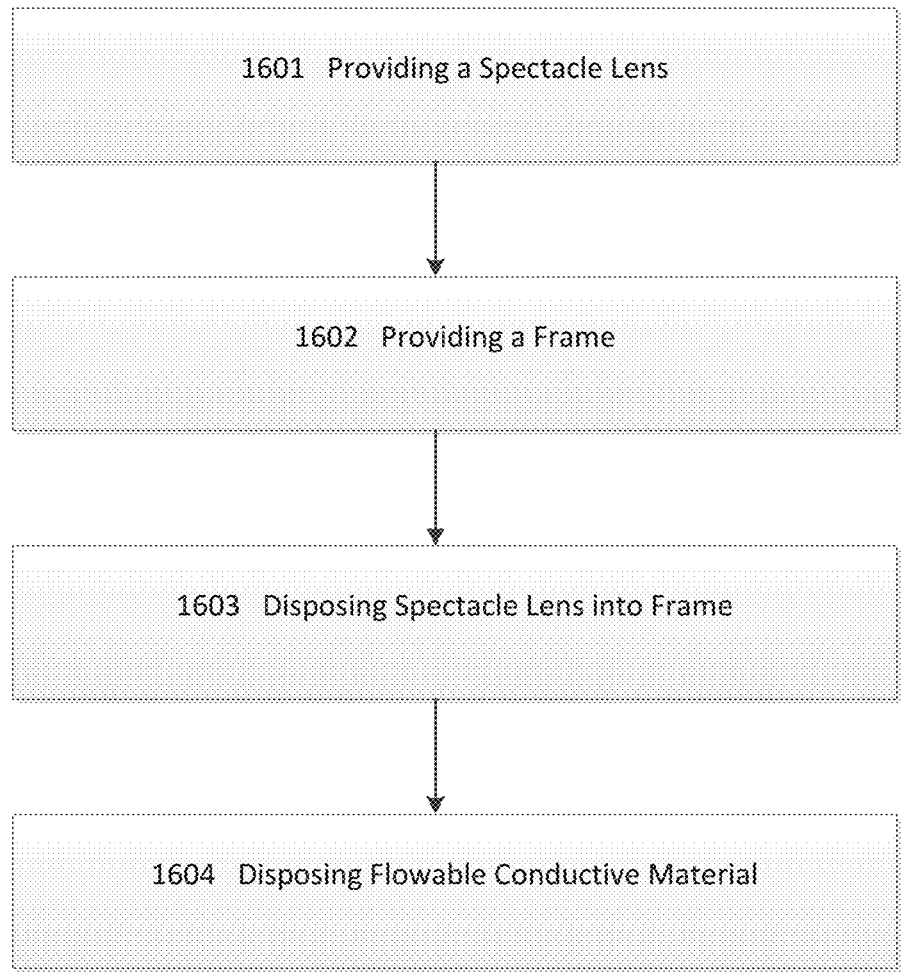
FIG. 16 depicts a flow chart showing an embodiment of a method of forming an electrical connection between a spectacle lens and a frame.

FIG. 16 depicts a flow chart showing an embodiment of a method of forming an electrical connection between a spectacle lens and a frame 1600, comprising: providing a spectacle lens, which comprises an electro-active region in an interior portion, an electrical contact on an edge portion, and a transparent wire electrically connecting the electro-active region to the edge contact 1601; providing a frame, which comprises an electrical contact disposed on an interior portion of the frame 1602; disposing the spectacle lens into the frame 1603; and disposing an amount of the flowable conductive material between the spectacle lens and the frame, such that the flowable conductive material makes contact with and electrically connects the electrical contact of the spectacle lens and the electrical contact of the frame 1604.

The invention claimed is:

1. A method of forming an electrical connection between a spectacle lens and a frame, the method comprising:

providing a spectacle lens comprising an electro-active region in an interior portion, an electrical contact on an edge portion, and a transparent wire electrically connecting the electro-active region to the electrical contact of the spectacle lens;

forming a conductive layer comprising a conductive primer layer and a conductive paint layer on a portion of the lens with the electrical contact of the spectacle lens;

providing a frame comprising an electrical contact; and disposing a flowable conductive material between (a) the conductive layer and (b) the electrical contact of the frame, the flowable conductive material being curable.

2. The method of claim 1, wherein the disposing the flowable conductive material comprises:

disposing an amount of the flowable conductive material onto the portion of the lens with the electrical contact of the spectacle lens; and disposing the spectacle lens into the frame such that the flowable conductive material (a) makes contact with the conductive layer and (b) electrically connects the electrical contact of the spectacle lens and the electrical contact of the frame.

3. The method of claim 1, wherein the disposing the flowable conductive material comprises:

disposing an amount of the flowable conductive material onto an interior portion of the frame; and disposing the spectacle lens into the frame such that the flowable conductive material (a) makes contact with the conductive layer and (b) electrically connects the electrical contact of the spectacle lens and the electrical contact of the frame.

4. The method of claim 1, wherein the disposing the flowable conductive material comprises:

disposing the spectacle lens into the frame; and disposing an amount of the flowable conductive material between the spectacle lens and the frame, such that the flowable conductive material (a) makes contact with the conductive layer and (b) electrically connects the electrical contact of the spectacle lens and the electrical contact of the frame.

5. The method of claim 1, further comprising, following the disposing the flowable conductive material, curing the flowable conductive material to form a flexible conductive element.

6. The method of claim 1, wherein the conductive material comprises an adhesive binder and conductive particles.

7. The method of claim 1, wherein the electrical contact of the lens, the conductive primer layer, and the conductive paint layer are arranged in that order.

8. The method of claim 1, wherein the conductive primer layer, the conductive paint layer, and the flowable conductive material are arranged in that order.

9. A pair of spectacles comprising:

a lens comprising an electro-active region in an interior portion, and an electrical contact on an edge portion electrically connected to the electro-active region;

a controller;

a frame, wherein the frame comprises a contact disposed adjacent to the lens, and one or more wires electrically connecting the contact of the frame to the controller;

a conductive element electrically connecting the electrical contact of the lens to the contact of the frame, the conductive element being at least partially formed from a conductive elastomeric material disposed between the electrical contact of the lens and the contact of the frame; and a conductive layer comprising a conductive primer layer and a conductive paint layer, formed on a portion of the lens with the electrical contact of the lens, and contacting the conductive element.

10. The pair of spectacles of claim 9, wherein the portion of the lens with the electrical contact is coated with the conductive layer.

11. The pair of spectacles of claim 9, further comprising a conductive rubber piece disposed between (a) either or both of the electrical contact of the lens and the contact of the frame and (b) the conductive element.

12. The pair of spectacles of claim 9, wherein the controller is disposed on or within the frame.

13. The pair of spectacles of claim 9, wherein the conductive element is disposed in a first cavity which is formed by a groove formed on an outer edge of the lens, a groove formed on an inner edge of the frame, or a combination thereof.

14. The pair of spectacles of claim 9, wherein the conductive elastomeric material is flexible or moisture resistant.

15. The pair of spectacles of claim 9, wherein the conductive elastomeric material comprises an adhesive binder and conductive particles.

16. The pair of spectacles of claim 15, wherein the adhesive binder comprises a material selected from the group consisting of a silicone resin, an epoxy resin, a polyurethane resin, and any combinations thereof.

17. The pair of spectacles of claim 15, wherein the adhesive binder comprises epoxy resin.

18. The pair of spectacles of claim 15, wherein the conductive particles are selected from the group consisting of silver particles, silver-coated particles, nickel, nickel-coated particles, and any combination thereof.

19. The pair of spectacles of claim 18, wherein the silver coated particles are silver-plated aluminum, silver-plated copper, and any combinations thereof.

20. The pair of spectacles of claim 18, wherein the nickel-coated particles are nickel-coated carbon.

21. The pair of spectacles of claim 9, wherein a surface of the conductive primer layer and a surface of the conductive paint layer are scored.

22. The pair of spectacles of claim 9, wherein the electrical contact of the lens, the conductive primer layer, and the conductive paint layer are arranged in that order.

23. The pair of spectacles of claim 9, wherein the conductive primer layer, the conductive paint layer, and the conductive element are arranged in that order.

* * * * *